(12) United States Patent
Yu et al.

(10) Patent No.: US 10,201,222 B2
(45) Date of Patent: Feb. 12, 2019

(54) BRUSH HEAD AND ITS PRODUCING DEVICE

(71) Applicants: Hoipo Yu, Lai Chi Kok (HK); Jianxin Zhou, Lai Chi Kok (HK)

(72) Inventors: Hoipo Yu, Lai Chi Kok (HK); Jianxin Zhou, Lai Chi Kok (HK)

( * ) Notice: Subject to any disclaimer, the term of this patent is extended or adjusted under 35 U.S.C. 154(b) by 668 days.

(21) Appl. No.: 14/810,426

(22) Filed: Jul. 27, 2015

(65) Prior Publication Data

US 2016/0022026 A1    Jan. 28, 2016

Related U.S. Application Data

(62) Division of application No. 12/998,807, filed as application No. PCT/CN2009/071329 on Apr. 17, 2009.

(51) Int. Cl.
| | |
|---|---|
| *A46B 3/04* | (2006.01) |
| *A46B 3/06* | (2006.01) |
| *A46D 3/04* | (2006.01) |
| *A46B 3/00* | (2006.01) |
| *A46B 7/04* | (2006.01) |
| *A46D 1/06* | (2006.01) |
| *A46D 3/00* | (2006.01) |
| *A46D 3/08* | (2006.01) |
| *A46D 9/02* | (2006.01) |
| *B29B 13/02* | (2006.01) |
| *B29L 31/42* | (2006.01) |

(52) U.S. Cl.
CPC .............. *A46D 3/045* (2013.01); *A46B 3/005* (2013.01); *A46B 3/06* (2013.01); *A46B 7/04* (2013.01); *A46D 1/06* (2013.01); *A46D 3/00* (2013.01); *A46D 3/04* (2013.01); *A46D 3/085* (2013.01); *A46D 3/087* (2013.01); *A46D 9/02* (2013.01); *B29B 13/02* (2013.01); *A46B 2200/1046* (2013.01); *A46B 2200/1066* (2013.01); *A46B 2200/202* (2013.01); *A46B 2200/302* (2013.01); *B29L 2031/42* (2013.01)

(58) Field of Classification Search
CPC .......... A46D 3/085; A46D 3/087; A46D 9/06; A46D 1/06
See application file for complete search history.

(56) References Cited

U.S. PATENT DOCUMENTS

| | | | | |
|---|---|---|---|---|
| 3,875,608 | A * | 4/1975 | Weiss ........................ | A46B 3/12 15/193 |
| 4,637,660 | A * | 1/1987 | Weihrauch ............... | A46B 3/06 264/243 |
| 5,538,328 | A * | 7/1996 | Lewis, Jr. ................ | A46B 3/06 300/21 |
| 5,622,411 | A * | 4/1997 | Weihrauch ............... | A46B 3/04 264/243 |
| 5,728,408 | A * | 3/1998 | Boucherie ................ | A46D 3/00 264/243 |

(Continued)

FOREIGN PATENT DOCUMENTS

EP              1593321 A1 * 11/2005 ............... A46B 9/12

*Primary Examiner* — Michael Jennings
(74) *Attorney, Agent, or Firm* — Raymond Y. Chan; David and Raymond Patent Firm

(57) ABSTRACT

A brush includes a brush head which comprises a brush support, and a plurality of brushing members integrally provided on the brush support, wherein the brushing members and the brush support are integrally formed together by heat treatment.

9 Claims, 6 Drawing Sheets

(56) References Cited

U.S. PATENT DOCUMENTS

| | | | | |
|---|---|---|---|---|
| 5,927,819 A * | 7/1999 | Philipp | ............ | A46D 1/05 300/11 |
| 6,695,413 B1 * | 2/2004 | Barwick | ............ | A46B 3/06 15/191.1 |
| 9,750,334 B2 * | 9/2017 | Kirchhofer | ............ | A46B 9/04 |
| 2011/0225758 A1 * | 9/2011 | Chung | ............ | A46B 9/04 15/167.1 |

* cited by examiner

BRUSH HEAD AND ITS PRODUCING DEVICE

CROSS REFERENCE OF RELATED APPLICATION

This is a Divisional application that claims the benefit of priority under 35 U.S.C. § 119 to a non-provisional application, application Ser. No. 12/998,807, filed Jun. 2, 2011, which is a U.S. National Stage under 35 U.S.C. 371 of the International Application Number PCT/CN2009/071329, filed Apr. 17, 2009, which claims priority under 35 U.S.C. 119(a-d) to Chinese application number 200810218389.1, filed Dec. 9, 2008.

BACKGROUND OF THE PRESENT INVENTION

Field of Invention

The present invention relates to a brush, and more particularly to a brush head and its producing device.

Description of Related Arts

Conventionally, people use a wide variety of brushes for different purposes. For example, people may use toothbrush, broom, or make-up brush for their specific purposes. A conventional bush usually comprises a base, and a plurality of brushing members, wherein the base usually has a plurality of attachment holes for securely accommodating the brushing members. The disadvantage of this type of conventional brush is that when the brush has been used for an extended period of time, the brushing members lose their strength and detach from the attachment holes (i.e. detached from the base). Moreover, since the brushing members are usually pressed into the corresponding attachment holes, when this procedure is not carried out properly, the brushing members will be damaged by the pressing machine and this problem severely shorten the general lifespan of the relevant brushes.

SUMMARY OF THE PRESENT INVENTION

The invention is advantageous in that it provides a brush having an extended product life span.

Another advantage of the invention is to provide a producing device which is capable of manufacturing brushes having extended product lifespan.

According to the present invention, the foregoing and other objects and advantages are attained by providing a brush, comprising a brush head which comprises a brush support, and a plurality of brushing members integrally provided on the brush support.

Moreover, the present invention provides a brush producing device for manufacturing a brush having a brush support and a plurality of brushing members, wherein the brush producing device comprises a securing device for holding a the brushing members in a predetermined pattern, and has a molding cavity for integrally connecting the brushing members and the brush support, wherein the securing device is positioned above the molding cavity.

As compared with conventional arts, the present invention provides a brush wherein the brush support and the brushing members are integrally formed so as to avoid uneven connection between these two elements. As such, the brushing members are substantially prevented from detaching from the brush support irrespective of the diameter of the brushing members. With all these features, the general product life span of the present invention can be substantially prolonged.

Moreover, the present invention provides a brush producing device for manufacturing a brush having a brush support and a plurality of brushing members, wherein the brush producing device comprises a securing device for holding the brushing members in a predetermined pattern. Since the brush support and the brushing members are integrally formed so as to avoid uneven connection between these two elements, the general product life span of the present invention can be substantially prolonged.

DETAILED DESCRIPTION OF THE PREFERRED EMBODIMENT

Figure 1:
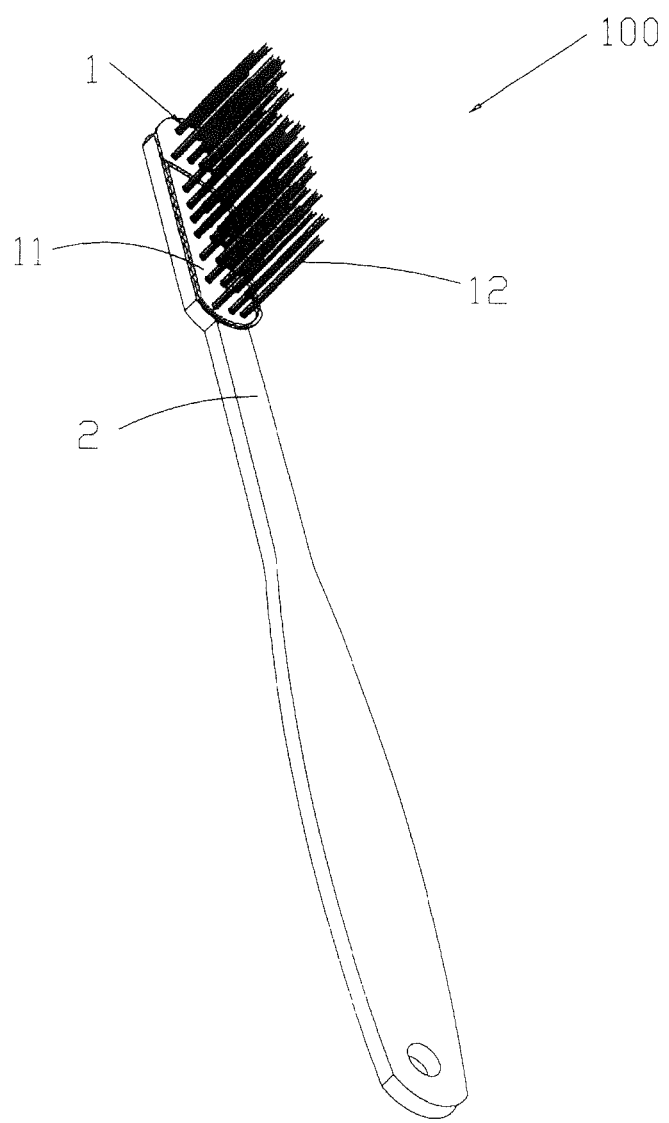
FIG. 1 is a schematic diagram of a brush according to a preferred embodiment of the present invention.

One skilled in the art will understand that the embodiment of the present invention as shown in the drawings and described below is exemplary only and not intended to be limiting. The preferred embodiment of the present invention is described in details below.

Figure 2:
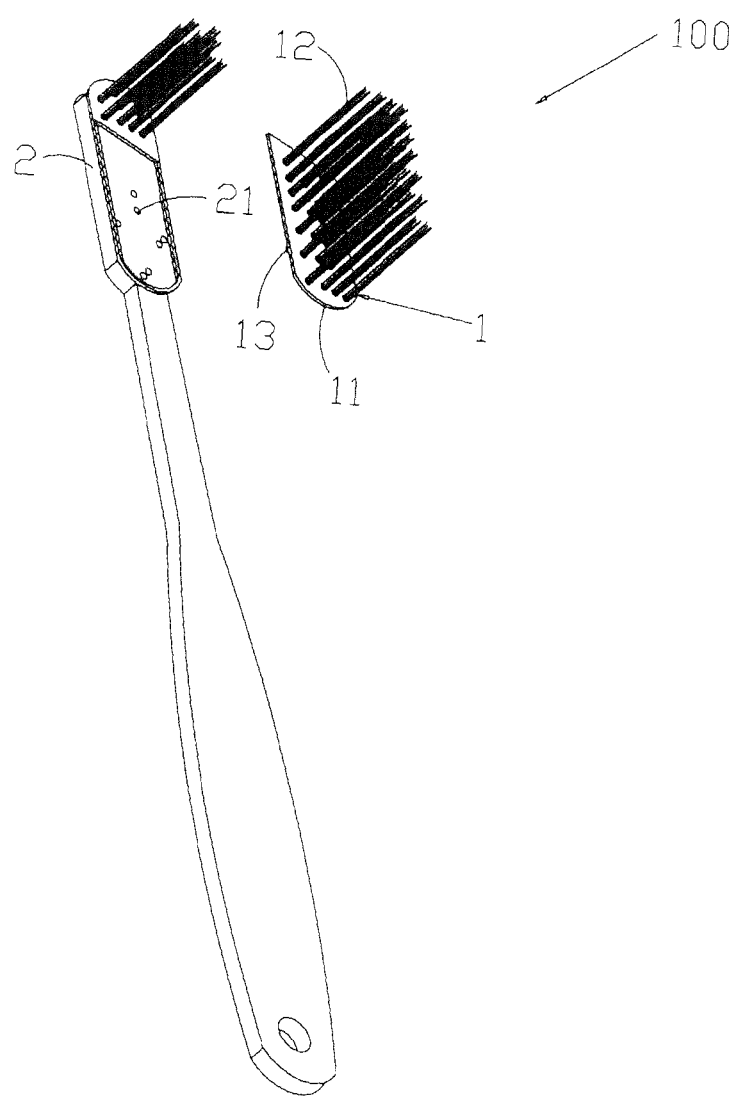
FIG. 2 is an exploded view of a brush according to the above preferred embodiment of the present invention.
Figure 3:
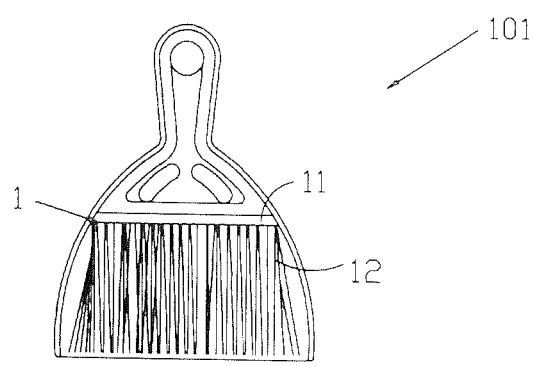
FIG. 3 is a schematic diagram of a brush according to the above preferred embodiment of the present invention, illustrating that the brush is embodied as a broom.
Figure 4:
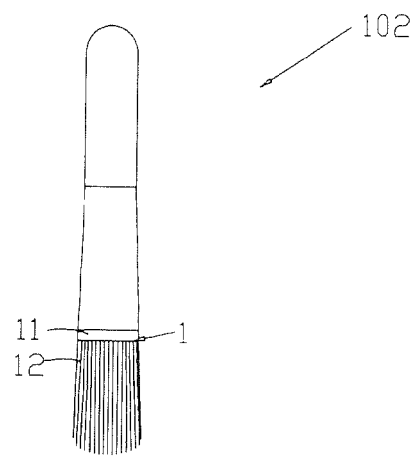
FIG. 4 is a schematic diagram of a brush according to the above preferred embodiment of the present invention, illustrating that the brush is embodied as a makeup brush.
Figure 5:
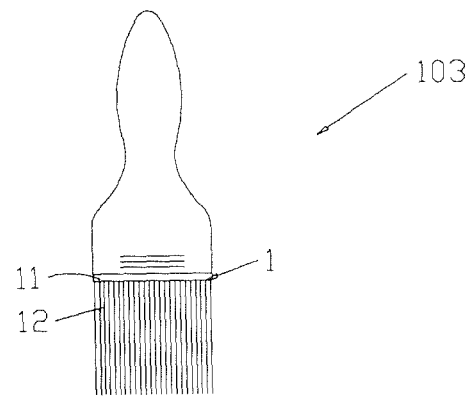
FIG. 5 is a schematic diagram of a brush according to the above preferred embodiment of the present invention, illustrating that the brush is embodied as a painting brush.
Figure 6:
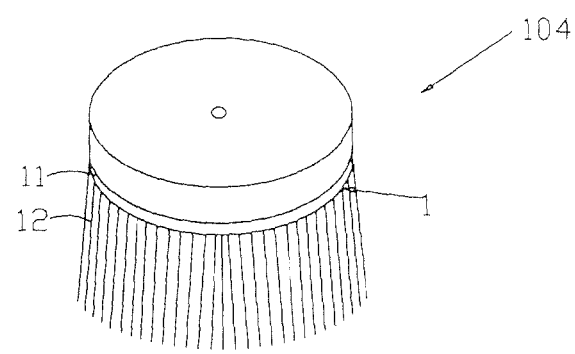
FIG. 6 is a schematic diagram of a brush according to the above preferred embodiment of the present invention, illustrating that the brush is embodied as a cleaning brush.

Referring to FIG. 1 to FIG. 2 of the drawings, a brush according to a preferred embodiment of the present invention is illustrated, in which the brush comprises a brush head 1 comprising a brush support 11, and a plurality of brushing members 12 integrally provided on the brush support 11.

More specifically, the brush support 11 and the brushing members 12 are made of the same material so that the brushing members 12 and the brush support 11 can be heated to integrally fuse with each other so as to produce an integral body of the brush support 11 and the brushing members 12.

The brush further comprises an elongated base member 2 supporting the brush head 1 and is extended from the brush support 11, wherein the base member 2 has a plurality of engagement slots 21 formed at a top front portion thereof, while the brush support 11 further has a plurality of engagement members 13 downwardly extended from a bottom side thereof, wherein each of the engagement members 13 is aligned with a corresponding engagement slot 21 formed on the base member 2. Thus, the engagement members 13 are arranged to insert into the engagement slots 21 respectively so as to securely and detachably attach the brush support 11 onto the base member 2. As shown in FIG. 2 of the drawings, the engagement slots 21 are spacedly formed on the base member 2, while the engagement members 13 are spacedly formed on the brush support 11 and are aligned with the engagement slots 21 respectively. As such, when the brush head 1 has been used for an extended period of time and becomes old, a user may be able replace the old brush head 1 with a new one, while the base member 2 can be continuously used. Thus, the user does not need to replace the entire brush and this feature makes the present invention environmentally friendly.

It is worth mentioning that a diameter of each of the brushing members 12 can be varied and adjusted according to the actual circumstances in which the present invention is utilized. For example, for a toothbrush as shown in FIG. 1, the diameter of those brushing members 12 which are distributed along a peripheral edge of the brush support 11 is larger than that of those which are distributed on the mid portion of the brush support 11 so as to prevent the brushing members 12 having the smaller diameter to bend outwardly.

Moreover, it is important to stress that the integral connection between the brush support 11 and the brushing members 12 can be any connection and any variation is within the scope of protection of the present invention.

As compared with conventional arts, the present invention provides a brush wherein the brush support 11 and the brushing members 12 are integrally formed so as to avoid uneven connection between these two elements. As such, the brushing members 12 are substantially prevented from detaching from the brush support 11 irrespective of the diameter of the brushing members 12. With all these features, the general product life span of the present invention can be substantially prolonged.

Referring to FIG. 3 to FIG. 6 of the drawings, the above-mentioned structure of a brush can be applied to a broom 101, a makeup brush 102, a painting brush 103, a cleaning brush 104, or other brushing devices. All these brushes have brushing members 12 which are made of soluble fiber material and are integrally connected to the brush support. All these variations are within the scope of the present invention.

Figure 7:
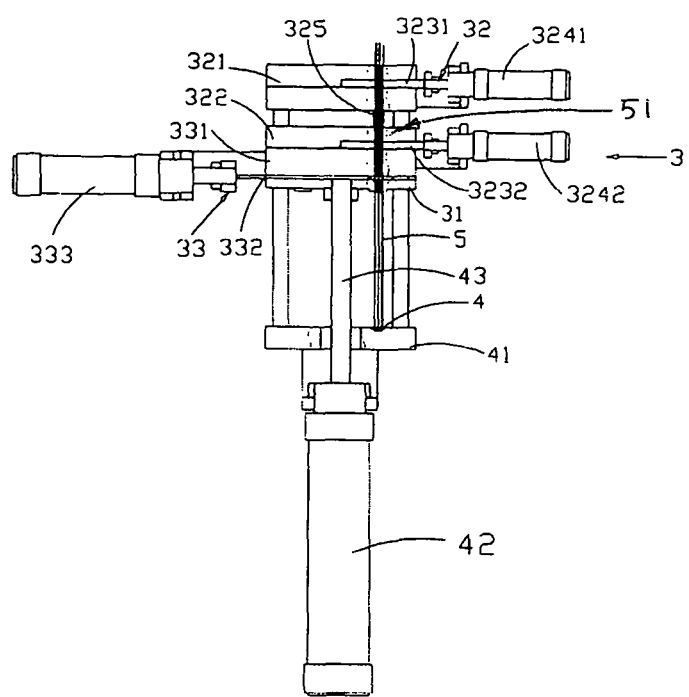
FIG. 7 is a first schematic diagram of a brush producing device according to the above preferred embodiment of the present invention.
Figure 8:
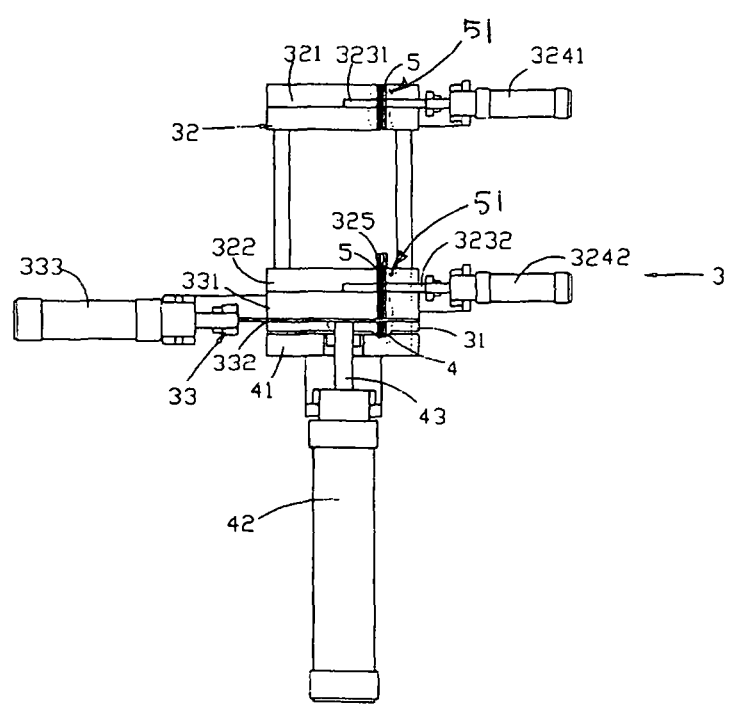
FIG. 8 is a second schematic diagram of a brush producing device according to the above preferred embodiment of the present invention.

Referring to FIG. 7 to FIG. 8 of the drawings, the present invention also provides a device for manufacturing the brush as mentioned above. The brush producing device according to the preferred embodiment of the present invention comprises a securing device 3 for holding the brushing members 12 in a predetermined pattern, and has a molding cavity 4 for integrally connecting the brushing members 12 and the brush support 11, wherein the securing device 3 is positioned above the molding cavity 4. In this brushing producing device, the securing device 3 is arranged to hold the brushing members 12 stably which are then integrally connected to the brush support 11 in the molding cavity 4. As such, the brush support 11 and the brushing members 12 are integrally formed so as to avoid uneven connection between these two elements. The brushing members 12 are substantially prevented from detaching from the brush support 11, and the general product life span of the present invention can be substantially prolonged.

More specifically, the brushing producing device further comprises a molding frame 41, and a heating device. The molding cavity 4 has a shape substantially the same as that of the brush support 11, wherein the raw brushing elements 5 are transported to the molding cavity 4 by the securing device 3 and heated by the heating device to integrally connect with the brush support 11 for forming the brushing members 12. It is worth mentioning that the shape of the molding cavity 4 can be predetermined according to the manufacturing or marketing needs of the brush. For example, when the manufacturing is making a broom, the shape of the molding cavity 4 should be correspondingly adjusted.

The securing device 3 comprises a securing member 31, a holding device 32 for holding the raw brushing elements 5, and a cutter device 33 provided between the securing member 31 and the holding device 32 for cutting the raw brushing elements 5 at predetermined intervals. Each of the securing member 31, the holding device 32 and the cutter device 33 has a plurality of passing holes 51 for allowing the raw brushing elements 5 to pass therethrough. In other words, the raw brushing elements 5 are stably held by the holding device 32 and are extended to the molding cavity 4 through the passing holes 51. The securing member 31 has a predetermined height and extends along a longitudinal direction of the raw brushing elements 5, wherein the cutter device 33 is transversely provided slightly above a top edge of the securing member 31 so that the cutter device 33 is arranged to cut the raw brushing elements 5 to have a length substantially the same as the height of the securing member 31.

The cutter device 33 comprises a guiding board 331 and a cutting knife 332 provided underneath the guiding board 331, and a driving device 333 connected to the cutting knife 332, wherein the driving device 333 is arranged to drive the cutting knife 332 to cut the raw brushing elements 5 into a predetermined length.

The holding device 32 comprises a first and a second holding member 321, 322, and a first and a second locker driver device 3241, 3242. The first holding member 321 comprises a first locker member 3231 while the second holding member 322 comprises a second locker member 3232, wherein the first locker member 3231 is connected to the locker driver device 3241, while the second locker member 3232 is connected to the second locker driver device 3242. Each of the first and the second locker member 3231, 3232 has a plurality of passing holes 51 for allowing the raw brushing elements 5 to pass therethrough. The first and the second locker member 3231, 3232 are driven to move by the first and the second locker driver device 3241, 3242 respectively to selectively tighten the raw brushing elements 5 so as to selectively hold the raw brushing elements 5 in position for ease of cutting by the cutter device 33.

The holding device 32 further comprises a guiding tube 325 extended between the first and the second holding member 321, 322 and communicates with the corresponding passing holes 51 for facilitating easy passage of the raw brushing elements 5 along the passing holes 51.

On the other hand, the brush producing device further comprises an actuating device 42 provided underneath the molding frame 41 for actuating the securing device 3, wherein the actuating device 42 comprises an actuating member 43 extends across the molding frame 41 to bias against the securing member 31. When the actuating device 42 is activated, the actuating device 42 is arranged to drive the securing member 31 to move along a vertical direction.

The first and the second locker driver device, 3241, 3242, the driving device 333 and the actuating device 42 can be embodied as a wide variety of driving devices.

The manufacturing process of the brush and the brush head 1 is as follows:

1. The securing device 31 and the molding frame 41 are opened to receive the raw brushing elements 5. The raw brushing elements 5 are arranged to pass through the passing holes 51 provided on the first holding member 321, the guiding tube 325, the second holding member 322, the first locker member 3231, the second locker member 3232, the guiding board 331, and the securing member 31 and extend to receive in the molding frame 41 and the molding cavity 4.

2. The second locker member 3232 is driven to move transversely so as to tighten up the raw brushing elements 5 because the second holding member 322 and the guiding board 331 remain stationary for generating an enhanced tension on the raw brushing elements 5.

3. The securing device 31 is driven to move downwardly along with the raw brushing elements 5. The raw brushing elements 5 are then transported to the molding cavity 4 for being heated to integrally connect with the brush support 11. The securing device 31 continues to move downwardly until it reaches the molding frame 41.

4. When the securing device 31 reaches the molding frame 41, the cutting device 33 is activated to cut the raw brushing elements 5 into the brushing members 12.

5. The securing device 31 is then upwardly moved back to its original position.

6. When the securing device 31 is moving upwardly, the raw brushing elements 5 remain stationary. The brush head 1 is then removed from the molding cavity 4 and the above cycle continues.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of producing a brush which comprises a brush support and a plurality of brushing member, comprising the steps of:
   (a) holding a plurality of raw brushing members in a predetermined pattern by a holding device of a securing device;
   (b) cutting said plurality of raw brushing elements at predetermined intervals to have a length substantially the same as a height of a securing member of said securing device by a cutter device;
   (c) passing said plurality of raw brushing elements through each of a plurality of passing holes of said holding device and cutter device;
   (d) transporting said brushing members to a molding cavity through said passing holes by said securing device for heat treatment; and
   (e) heating said raw brushing elements in said molding cavity by a heating device for integrally connecting with said brush support forming a brush head and said brushing members.

2. The method, as recited in claim 1, wherein said securing member has a predetermined height and extends along a longitudinal direction of said raw brushing elements, wherein said cutter device is transversely provided slightly above a top edge of said securing member so that said cutter device is arranged to cut said raw brushing elements to have said length substantially the same as said height of said securing member.

3. The method, as recited in claim 2, wherein said cutter device comprises a guiding board and a cutting knife provided underneath said guiding board, and a driving device connected to said cutting knife, wherein said driving device is arranged to drive said cutting knife to cut said raw brushing elements into a predetermined length.

4. The method, as recited in claim 3, wherein said holding device comprises a first and a second holding member, and a first and a second locker driver device, wherein said first holding member comprises a first locker member while said second holding member comprises a second locker member, wherein said first locker member is connected to said locker driver device, while said second locker member is connected to said second locker driver device, wherein each of said first and second locker members has said plurality of passing holes for allowing said raw brushing elements to pass therethrough, wherein said first and second locker members are driven to move by said first and second locker driver devices respectively to selectively tighten said raw brushing elements so as to selectively hold said raw brushing elements in position for ease of cutting by said cutter device.

5. The method, as recited in claim 4, wherein said holding device further comprises a guiding tube extended between said first and second holding members and communicates with said passing holes for facilitating easy passage of said raw brushing elements along said passing holes.

6. The method, as recited in claim 5, wherein an actuating device is provided underneath said molding frame for actuating said securing device, wherein said actuating device comprises an actuating member extending across said molding frame to bias against the securing member, wherein when said actuating device is activated, said actuating device is arranged to drive said securing member to move along a vertical direction.

7. The method, as recited in claim 6, wherein the step (c) further comprises the steps of:
   (c1) opening said securing device and a molding frame to receive said raw brushing elements; and
   (c2) passing said raw brushing elements through said passing holes on said first holding member, said guiding tube, said second holding member, said first locker member, said second locker member, said guiding board, and said securing member.

8. The method, as recited in claim 7, wherein the step (d) further comprises the steps of:
   (d1) extending to receive in said molding frame and said molding cavity;
   (d2) driving said second locker member to move transversely and tightening up said raw brushing elements while said second holding member and said guiding board remaining stationary for generating an enhanced tension on said raw brushing elements; and
   (d3) driving said securing device to move downwardly along with said raw brushing elements so as to transport said raw brushing elements to said molding cavity while said securing device continuously moving downwardly until reaching said molding frame.

9. The method, as recited in claim 8, wherein the step (e) further comprises the steps of:
   (e1) activating said cutting device to cut said raw brushing elements into said brushing members while said securing device reaching said molding frame;
   (e2) moving said securing device upwardly back to an original position thereof; and
   (e-3) removing said brush head from said molding cavity when said securing device is moving upwardly and said raw brushing elements remaining stationary.

\* \* \* \* \*